US006260897B1

(12) United States Patent

Carano

(10) Patent No.: US 6,260,897 B1
(45) Date of Patent: Jul. 17, 2001

(54) DISC GRIPPING TOOLS

(76) Inventor: Kevin K. Carano, 976 W. Aurora Rd., Northfield, OH (US) 44067

( * ) Notice: Subject to any disclaimer, the term of this patent is extended or adjusted under 35 U.S.C. 154(b) by 0 days.

(21) Appl. No.: 09/569,623

(22) Filed: May 12, 2000

(51) Int. Cl.[7] .............................. B25B 9/00; B25J 15/08

(52) U.S. Cl. .............................. 294/26; 294/28; 294/118; 294/902

(58) Field of Search .............................. 294/11, 16, 26, 294/28, 31.1, 118, 902

(56) References Cited

U.S. PATENT DOCUMENTS

| | | | | |
|---|---|---|---|---|
| 1,768,937 | * | 7/1930 | Sheppard | 294/28 |
| 2,421,509 | * | 6/1947 | Knapp | 294/31.1 |
| 2,531,304 | * | 11/1950 | Seewald | 294/118 X |
| 2,559,978 | * | 7/1951 | Marco | 294/28 |
| 4,005,893 | * | 2/1977 | Tash | 294/16 X |
| 5,110,167 | * | 5/1992 | Friend | 294/16 |
| 5,192,106 | * | 3/1993 | Kaufman | 294/16 X |

* cited by examiner

*Primary Examiner*—Johnny D. Cherry

(57) ABSTRACT

A disc gripping tool for gripping the outside edge of a disc to prevent blemishes to the surface of the disc. The disc gripping tool includes a pair of elongate arms. Each of the first elongate arms comprises an elongate rod. The elongate rod has a distal portion, a middle portion and proximal portion. The proximal portion comprises a handle. The distal portion extends out of a plane of the middle portion and is orientated generally perpendicular to the middle portion. A first of the elongate arms is substantially a mirror image of a second of the elongate arms. A pivoting structure pivotally couples the first elongate arm to the second elongate arm.

12 Claims, 2 Drawing Sheets

DISC GRIPPING TOOLS

BACKGROUND OF THE INVENTION

1. Field of the Invention

The present invention relates to disc gripping tools and more particularly pertains to a new disc gripping tool for gripping the outside edge of a disc to prevent blemishes to the surface of the disc.

2. Description of the Prior Art

The use of disc gripping tools is known in the prior art. More specifically, disc gripping tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,110,167; U.S. Pat. No. 4,461,193; U.S. Pat. No. 2,723,877; U.S. Pat. No. 4,997,224; U.S. Pat. No. 4,595,221; and U.S. Des. Pat. No. 350,265.

While these devices fulfill their respective, particular objectives and requirements, the aforementioned patents do not disclose a new disc gripping tool. The inventive device includes a pair of elongate arms. Each of the first elongate arms comprises an elongate rod. The elongate rod has a distal portion, a middle portion and proximal portion. The proximal portion comprises a handle. The distal portion extends out of a plane of the middle portion and is orientated generally perpendicular to the middle portion. A first of the elongate arms is substantially a mirror image of a second of elongate arms. A pivoting means pivotally couples the first elongate arm to the second elongate arm.

In these respects, the disc gripping tool according to the present invention substantially departs from the conventional concepts and designs of the prior art, and in so doing provides an apparatus primarily developed for the purpose of gripping the outside edge of a disc to prevent blemishes to the surface of the disc.

SUMMARY OF THE INVENTION

In view of the foregoing disadvantages inherent in the known types of disc gripping tools now present in the prior art, the present invention provides a new disc gripping tool construction wherein the same can be utilized for gripping the outside edge of a disc to prevent blemishes to the surface of the disc.

The general purpose of the present invention, which will be described subsequently in greater detail, is to provide a new disc gripping tool apparatus and method which has many of the advantages of the disc gripping tools mentioned heretofore and many novel features that result in a new disc gripping tool which is not anticipated, rendered obvious, suggested, or even implied by any of the prior art disc gripping tools, either alone or in any combination thereof.

To attain this, the present invention generally comprises a pair of elongate arms. Each of the first elongate arms comprises an elongate rod. The elongate rod has a distal portion, a middle portion and proximal portion. The proximal portion comprises a handle. The distal portion extends out of a plane of the middle portion and is orientated generally perpendicular to the middle portion. A first of the elongate arms is substantially a mirror image of a second of elongate arms. A pivoting means pivotally couples the first elongate arm to the second elongate arm.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new disc gripping tool apparatus and method which has many of the advantages of the disc gripping tools mentioned heretofore and many novel features that result in a new disc gripping tool which is not anticipated, rendered obvious, suggested, or even implied by any of the prior art disc gripping tools, either alone or in any combination thereof.

It is another object of the present invention to provide a new disc gripping tool which may be easily and efficiently manufactured and marketed.

It is a further object of the present invention to provide a new disc gripping tool which is of a durable and reliable construction.

An even further object of the present invention is to provide a new disc gripping tool which is susceptible of a low cost of manufacture with regard to both materials and labor, and which accordingly is then susceptible of low prices of sale to the consuming public, thereby making such disc gripping tools economically available to the buying public.

Still yet another object of the present invention is to provide a new disc gripping tool which provides in the apparatuses and methods of the prior art some of the advantages thereof, while simultaneously overcoming some of the disadvantages normally associated therewith.

Still another object of the present invention is to provide a new disc gripping tool for gripping the outside edge of a disc to prevent blemishes to the surface of the disc.

Yet another object of the present invention is to provide a new disc gripping tool which includes a pair of elongate arms. Each of the first elongate arms comprises an elongate rod. The elongate rod has a distal portion, a middle portion and proximal portion. The proximal portion comprises a handle. The distal portion extends out of a plane of the middle portion and is orientated generally perpendicular to the middle portion. A first of the elongate arms is substantially a mirror image of a second of elongate arms. A pivoting means pivotally couples the first elongate arm to the second elongate arm.

Still yet another object of the present invention is to provide a new disc gripping tool that has a second bend therein so that the distal portions are positioned generally tangent to a peripheral edge of the disc when using the device.

Even still another object of the present invention is to provide a new disc gripping tool that has an elastomeric gripping means for gripping the disc.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
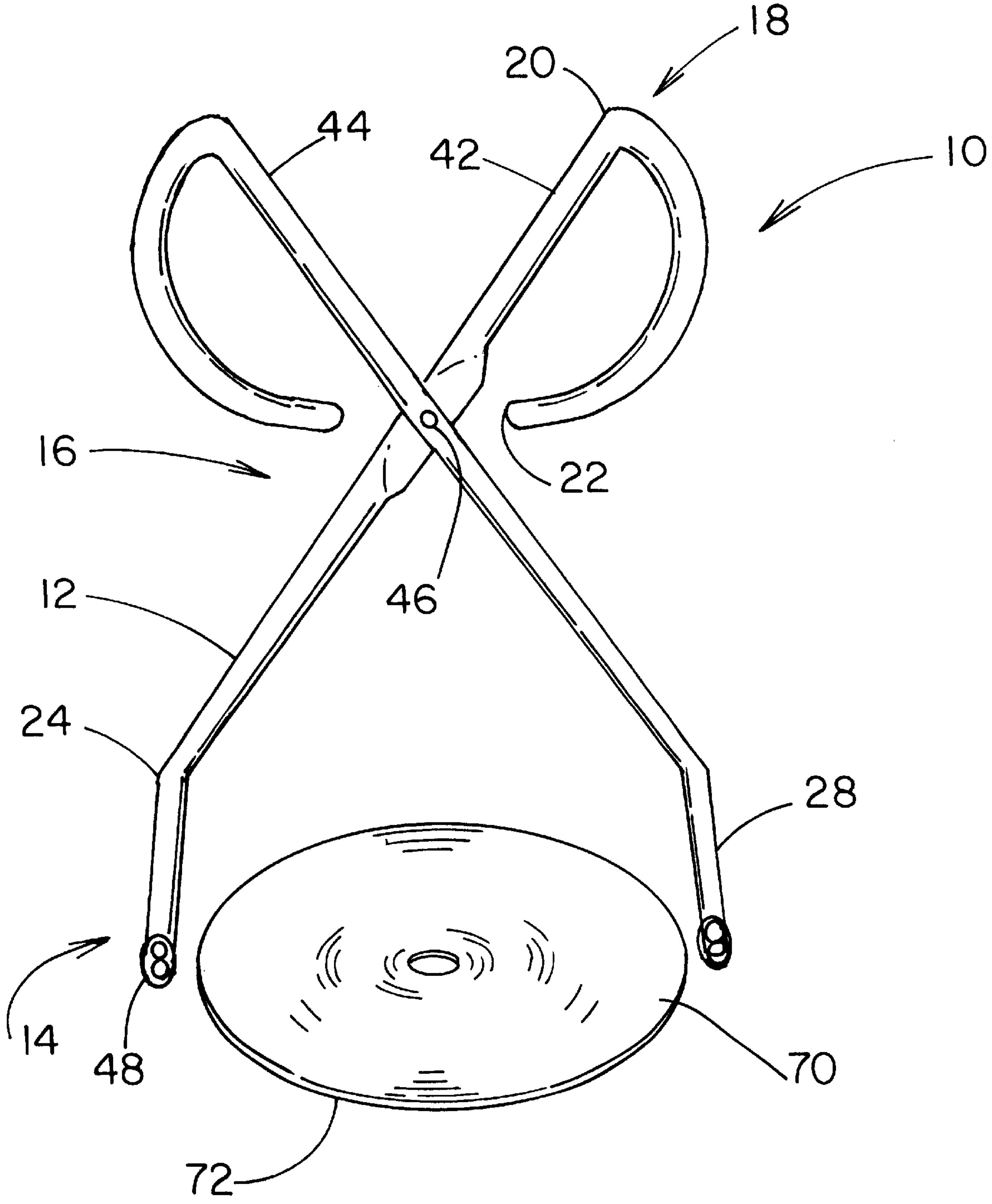
FIG. 1 is a schematic bottom view of a new disc gripping tool according to the present invention.
Figure 2:
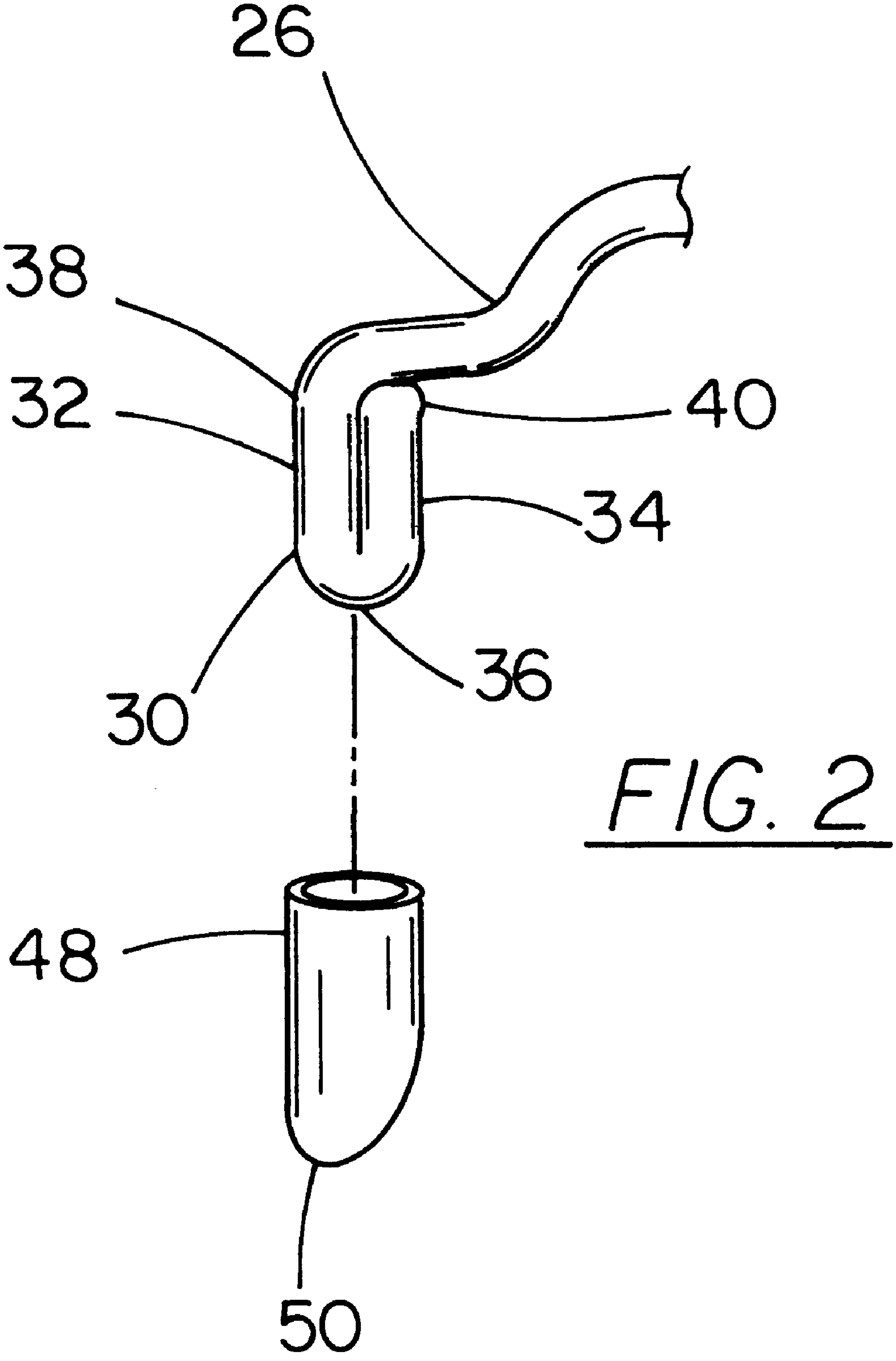
FIG. 2 is a schematic side view of the distal portion of the present invention.

With reference now to the drawings, and in particular to FIGS. 1 through 2 thereof, a new disc gripping tool embodying the principles and concepts of the present invention and generally designated by the reference numeral 10 will be described.

As best illustrated in FIGS. 1 through 2, the disc gripping tool 10 generally comprises a pair of elongate arms pivotally coupled together for grasping a disc.

Each of the first elongate arms comprises an elongate rod 12. The elongate rod 12 has a distal portion 14, a middle portion 16 and proximal portion 18. The rod 12 has a first bend 20 therein positioned generally between the middle 16 and proximal 18 portions. The proximal portion 18 is arced such that a free end 22 of the proximal portion 18 is positioned generally adjacent to the middle portion 16. The proximal portion 18 and the middle portion 16 lie in a first plane.

The rod 12 has a second bend 24 therein positioned generally between the middle portion 16 and the distal portion 14 such that an angle between the middle 16 and distal portions 14 is preferably between 130 and 170 degrees. The angle lies in a second plane wherein the first and second planes are substantially co-planar.

The distal portion 14 has an S-curve 26 therein. The S-curve 26 generally lies a plane orientated substantially perpendicular to the second plane. A section of the distal portion between the S-curve and the second bend defines a first section 28 of the distal portion 14. The S-curve 26 defines a second section of the distal portion. A third section 30 of the distal portion comprises a U-shaped member having a pair of legs 32, 34 and a middle section 36. The legs 32, 34 are abutted against each other. A first 32 of the legs has a free end 38 which is integrally coupled to the S-curve 26 such that a free end 40 of a second 34 of the legs is generally abutted against the S-curve 26. The distance between the S-curve 26 and the first bend 20 is preferably equal to a distance between 8 and 10 inches.

A first of the elongate arms 42 is substantially a mirror image of a second of elongate arms 44, such that when they are placed together, the proximal portions 18 are extending away from each other and the distal portions 14 are extending in a general parallel orientation with each other.

A pivoting means 46 pivotally couples the first elongate arm 42 to the second elongate arm 44. The pivoting means 46 comprises a rod extending through and pivotally coupling together the middle portions 16 of the first and second elongate arms 42, 44 such that the third sections 30 extend in substantially the same direction. The rod is generally positioned midway between the first 20 and second 24 bends.

A gripping means 48 aids in gripping the disc. The gripping means 48 substantially covers and is fixedly coupled to the third sections 30 of the distal portions 14. The gripping means 48 comprising an elastomeric material having a generally convex tip 50.

In use, the proximal portions 18 are used to actuate the device 10. The distal portions 14 are used to grip generally opposite edges of a disc 70 along its peripheral edge 72 such that top and bottom surfaces of the disc 70 are not touched.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A disc handling device for handling relatively fragile discs by a peripheral edge of said discs, said device comprising:

a pair of elongate arms, each of said elongate arms comprising an elongate rod having a distal portion, a middle portion and a proximal portion, said proximal portion comprising a handle, said distal portion extending out of a plane of said middle portion and being orientated generally perpendicular to the plane of said middle portion;

wherein a first of said elongate arms is substantially a mirror image of a second of said elongate arms; and a pivoting means for pivotally coupling said first elongate arm to said second elongate arm;

wherein each of said elongate rods has a first bend therein positioned generally between said middle and proximal portions, said proximal portion being arced such that a free end of said proximal portion is positioned generally adjacent to said middle portion, said proximal portion and said middle portion lying in a first plane;

wherein each of said elongate rods has a second bend therein positioned generally between said middle portion and said distal portion such that an angle between said middle and distal portions is substantially between 130 and 170 degrees, said middle and distal portions of said elongate rod located adjacent to said angle lying in a second plane wherein said first and second planes are substantially co-planar, said distal portion having an S-curve therein, said S-curve generally lying in a plane orientated substantially perpendicular to said second plane.

2. The disc handling device as in claim 1, further comprising:

a gripping means for gripping the discs, said gripping means being fixedly coupled to said distal portions of said first and second elongate arms.

3. The disc handling device as in claim 1, wherein each of said elongate rods has a section of said distal portion between said S-curve and said second bend defining a first section of said distal portion, said S-curve defining a second section of said distal portion, a third section of said distal portion comprising a U-shaped member having a pair of legs and a middle section, said legs being abutted against each other, a first of said legs having a free end being integrally coupled to said S-curve such that a free end of a second of said legs is generally abutted against said S-curve.

4. The disc handling device as in claim 3, further comprising:

a gripping means for gripping the disc, said gripping means substantially covering said third sections of said distal portions, said gripping means comprising an elastomeric material.

5. The disc handling device as in claim 1, wherein said pivoting means further comprises:

a rod extending through and pivotally coupling together said middle portions of said first and second elongate arms such that said distal portions extend in substantially the same direction.

6. A disc handling device for handling relatively fragile discs by gripping a peripheral edge of said discs, said device comprising:

a pair of elongate arms, each of said elongate arms comprising:

an elongate rod, said elongate rod having a distal portion, a middle portion and a proximal portion, said rod having a first bend therein positioned generally between said middle and proximal portions, said proximal portion being arced such that a free end of said proximal portion is positioned generally adjacent to said middle portion, said proximal portion and said middle portion lying in a first plane, said rod having a second bend therein positioned generally between said middle portion and said distal portion such that an angle between said middle and distal portions is substantially between 130 and 170 degrees, said middle and distal portions of said elongate rod located adjacent to said angle lying in a second plane wherein said first and second planes are substantially co-planar, said distal portion having an S-curve therein, said S-curve generally lying a plane orientated substantially perpendicular to said second plane, a section of said distal portion between said S-curve and said second bend defining a first section of said distal portion, said S-curve defining a second section of said distal portion, a third section of said distal portion comprising a U-shaped member having a pair of legs and a middle section, said legs being abutted against each other, a first of said legs having a free end being integrally coupled to said S-curve such that a free end of a second of said legs is generally abutted against said S-curve;

wherein a first of said elongate arms is substantially a mirror image of a second of said elongate arms;

a pivoting means for pivotally coupling said first elongate arm to said second elongate arm, said pivoting means comprising a rod extending through and pivotally coupling together said middle portions of said first and second elongate arms such that said third sections extend in substantially the same direction; and a gripping means for gripping the disc, said gripping means substantially covering and fixedly coupled to said third sections of said distal portions, said gripping means comprising an elastomeric material having a generally convex shaped tip.

7. A disc handling device for handling relatively fragile discs by a peripheral edge of said discs, said device comprising:

a pair of elongate arms, each of said elongate arms comprising an elongate rod having a distal portion, a middle portion and a proximal portion, said proximal portion comprising a handle, said distal portion extending out of a plane of said middle portion and being orientated generally perpendicular to the plane of said middle portion;

wherein a first of said elongate arms is substantially a mirror image of a second of said elongate arms; and a pivoting means for pivotally coupling said first elongate arm to said second elongate arm;

wherein each of said elongate rods has a first bend therein positioned generally between said middle and proximal portions, and wherein each of said elongate rods has a second bend therein positioned generally between said middle portion and said distal position;

wherein said distal portion has in S-curve therein;

wherein each of said elongate rods has a section of said distal portion between said S-curve and said second bend defining a first section of said distal portion, said S-curve defining a second section of said distal portion, a third section of said distal portion comprising a U-shaped member having a pair of legs and a middle section, said legs being abutted against each other, a first of said legs having a free end being integrally coupled to said S-curve such that a free end of a second of said legs is generally abutted against said S-curve.

8. The disc handling device as in claim 7, further comprising a gripping means for gripping the discs, said gripping means being fixedly coupled to said distal portions of said first and second elongate arms.

9. The disc handling device as in claim 7, wherein said proximal portion is arced such that a free end of said proximal portion is positioned generally adjacent to said middle portion, said proximal portion and said middle portion lying in a first plane.

10. The disc handling device as in claim 9, wherein an angle between said middle and distal portions is substantially between 130 and 170 degrees, said middle and distal portions of said elongate rod located adjacent to said angle lying in a second plane wherein said first and second planes are substantially co-planar, said S-curve generally lying a plane orientated substantially perpendicular to said second plane.

11. The disc handling device as in claim 7, wherein said pivoting means further comprises a rod extending through and pivotally coupling together said middle portions of said first and second elongate arms such that said distal portions extend in substantially the same direction.

12. The disc handling device as in claim 7, further comprising a gripping means for gripping the disc, said gripping means substantially covering said third sections of said distal portions.

* * * * *